United States Patent
Willden et al.

(10) Patent No.: US 6,814,916 B2
(45) Date of Patent: Nov. 9, 2004

(54) FORMING METHOD FOR COMPOSITES

(75) Inventors: Kurtis S. Willden, Kent, WA (US); Christopher G. Harris, Auburn, WA (US); Barry P. Van West, Bellevue, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/233,270

(22) Filed: Aug. 30, 2002

(65) Prior Publication Data

US 2004/0043196 A1 Mar. 4, 2004

(51) Int. Cl.$^7$ .......................... B29C 43/20; B29C 70/46
(52) U.S. Cl. ...................... 264/257; 264/258; 264/292; 264/324
(58) Field of Search ................................. 264/257, 258, 264/324, 291, 292

(56) References Cited

U.S. PATENT DOCUMENTS

| | | | |
|---|---|---|---|
| 3,956,447 A | * | 5/1976 | Denommee et al. ........ 264/135 |
| 4,657,717 A | * | 4/1987 | Cattanach et al. .......... 264/102 |
| 4,683,018 A | * | 7/1987 | Sutcliffe et al. ............ 156/196 |
| 4,986,865 A | | 1/1991 | Fujii |
| 5,199,595 A | * | 4/1993 | Muggli et al. .............. 220/450 |
| 5,292,475 A | | 3/1994 | Mead et al. |
| 5,368,807 A | | 11/1994 | Lindsay |
| 5,464,341 A | | 11/1995 | Tachibana et al. |
| 5,772,950 A | | 6/1998 | Brustad et al. |
| 5,882,462 A | | 3/1999 | Donecker et al. |
| 6,458,308 B1 | * | 10/2002 | Kato .......................... 264/257 |
| 2002/0167113 A1 | * | 11/2002 | Vendangeot et al. ........ 264/259 |

FOREIGN PATENT DOCUMENTS

JP    2002 248620 A    9/2002

* cited by examiner

Primary Examiner—Stefan Staicovici
(74) Attorney, Agent, or Firm—Black Lowe & Graham PLLC; Mark S. Beaufait

(57) ABSTRACT

A method for forming composite materials is presented, including providing a composite charge wider than a first surface of a mandrel, and positioning the composite charge across the first surface of the mandrel. The portion of the composite charge overhanging the first surface of the mandrel is supported and urged against the mandrel while supporting the unbent portion of the composite charge substantially parallel to the first surface of the mandrel. The invention also provides a system, using a compression mold of forming bladders and heater plates, to form a composite charge over a mandrel, while supporting the unbent portions of the composite charge during forming substantially parallel to the upper surface of the mandrel. The present invention minimizes the shear zone where plies in the composite laminate charge slide past one another during the forming process reducing or eliminating out-of-plane fiber buckling.

9 Claims, 4 Drawing Sheets

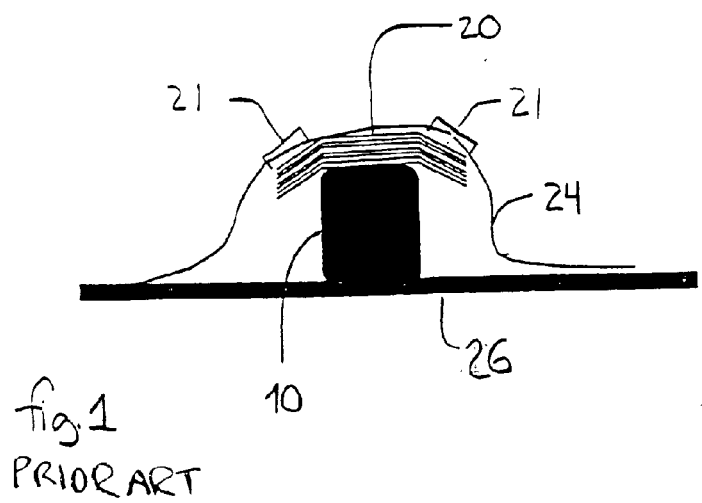
fig. 1
PRIOR ART
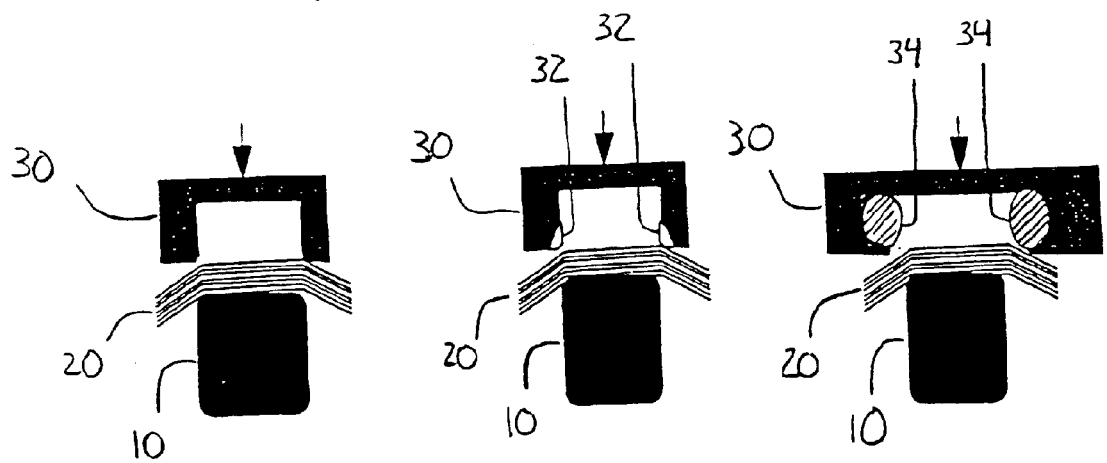
fig. 2A
PRIOR ART
fig. 2B
PRIOR ART
fig. 2C
PRIOR ART

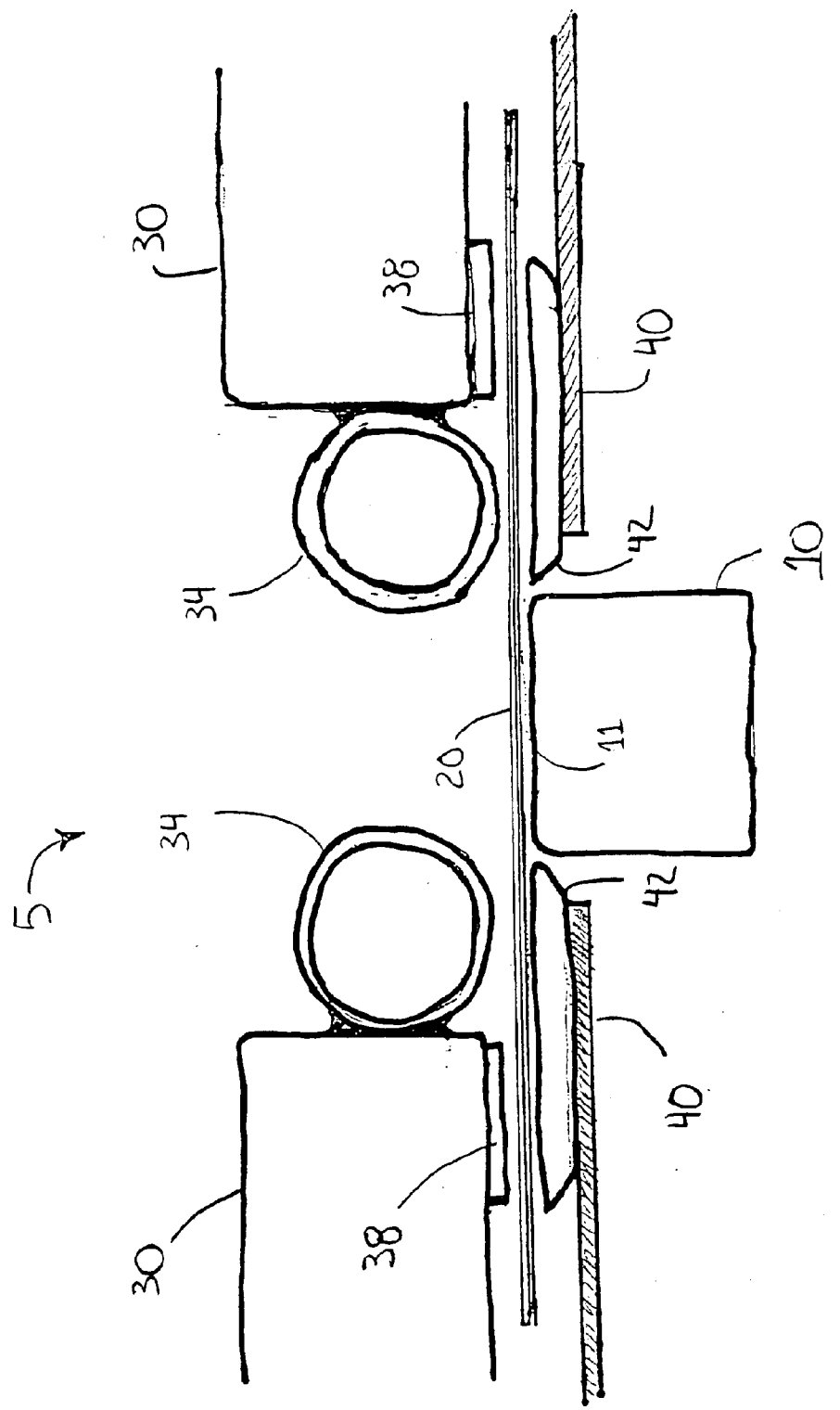

FORMING METHOD FOR COMPOSITES

RELATED APPLICATIONS

This application is related to concurrently filed patent application entitled, "Composite Spar Drape Forming Machine," and bearing Attorney Docket No. BOEI-1-1069, the contents of which are hereby incorporated by this reference.

FIELD OF THE INVENTION

This invention relates generally to forming composite materials, and, more specifically, to forming shaped composite parts.

BACKGROUND OF THE INVENTION

Formed composite parts are commonly used in applications, such as aircraft and vehicles, where light weight and high strength are desired. These applications typically utilize complex contoured parts or channels which must be formed and then cured. Historically, complex contoured composite structures have entailed extensive hand labor to form prior to curing. Typically, pre-impregnated composite fiber plies ("pre-pregs") such as epoxy impregnated carbon fiber laminates are laid by hand over a shaped form or mandrel. Then the part is cured, often by heat curing. Alternately, dry fabric plies ("dry fabric") may be laid-up, and then a bonding material is added. This results in a contoured part that matches the shape of the mandrel. However, manual lay-up of pre-preg plies or dry fabric is time-consuming.

An alternate forming method known as drape forming uses vacuum bagging. Drape forming has been used successfully to form composite parts where the parts being formed have only a few pre-preg plies. This method involves heating a flat laminate pre-preg composite blank or charge and forcing it around a mandrel with the use of a vacuum bag. However, this method has met with limited success on very thick laminates or more complex shapes. More complex shapes include beams of various shapes such as C, I, or L shapes, with long flange lengths, contours along their length, variable thicknesses, joggles or offsets. Composite parts which are thicker in some areas and thinner in others have "ply-drops" where plies end. This leaves the final cured part thicker in some areas and thinner in others. Long flange lengths add strength to composite members such as those used in aircraft structures. In many applications, the composite parts to be formed need to be contoured or have joggles or direction changes internal to the part.

Vacuum bag drape forming of such parts often results in wrinkling of the plies. Wrinkles occur because some laminate plies are in compression when bent or urged over the mandrel, and buckle when there is no constraint on the bending portion to prevent out-of-plane-buckling. Similarly, on long flange parts, slip resistance between the plies during bending becomes too great, and inner plies buckle. Buckling or wrinkling of the plies also occurs over tools or mandrels that are curved or contoured, or have joggles along their length. Even slight contours of a radius on the order of thousands of inches is enough to initiate wrinkles. As the composite pre-preg charge is bent over the mandrel, if the length of the flange is too long or slip resistance between the plies is too great, out-of-plane-buckling of the laminate will occur.

Current state-of-the-art drape forming techniques using vacuum bags have not been able to control the stress state and shear forces occurring during the composite forming process. As a result, complex contoured shapes are typically manufactured by ply-by-ply hand lay-up techniques. An improvement to vacuum bagging uses an inflated bag under the bending portions of composite charge as it is formed. This inflated bag progressively deflates as the vacuum bag forces the composite charge over the mandrel. This method has been found to slightly decrease out-of-plane buckling. However, hand forming of thick laminates and more complex shapes is still performed to minimize out-of-plane buckling.

Compression molding techniques also have been utilized to form composite pre-preg and dry fabric charges over a tool or a mandrel. However, such methods have encountered the same difficulties in preventing out-of-plane buckling of the laminate during the forming process. In compression molding, a female mold matching the forming mandrel is forced over the composite charge and the mandrel to form the charge.

FIG. 1 is a cross-sectional view of a prior art vacuum bag forming system for forming composite materials. A composite charge 20 is placed over a mandrel 10. It will be appreciated that the composite charge may be any suitable material for forming composite parts, including, without limitation, dry fabric or pre-preg plies. The mandrel 10 rests upon or is linked to a vacuum base 26. The vacuum base 26, mandrel 10, and composite charge 20 are covered by a vacuum bag 24. During forming of the composite charge 20 over the mandrel 10, the charge 20 is heated and air is evacuated from beneath the vacuum bag 24, This forms the overhanging portions 21 of the composite charge 20 that overhang the top of the mandrel 10. In this example, vacuum bagging is used to form the flanges of a C-shaped beam or spar. The laminate plies in the overhanging portion 21 of the composite charge 20 shear past one another as composite charge is formed by the vacuum bag 24 over the mandrel 10.

FIG. 2A illustrates the prior art method of compression molding a composite charge 20 over a mandrel 10. A composite charge 20 is placed over a forming tool or mandrel 10. A compression mold 30 is forced over the composite charge 20 and the mandrel 10, pressing the composite plies against the mandrel 10 and forming the part. FIGS. 2B and 2C show improved methods of compression molding. In FIG. 2B, a composite charge 20 is placed over a mandrel 10. A compression mold 30 with flexible tips 32 bends the composite charge 20 by being forced over the composite charge 20 and the mandrel 10. The flexible tips 32 at the corners of the mold 30 decrease out-of-plane buckling in the composite charge as it is formed, by smoothing the plies as they are formed over the mandrel 10.

FIG. 2C shows a further variation of prior art compression molding of a composite charge over a mandrel. In FIG. 2C, the composite charge 20 is placed over the mandrel 10. A compression mold 30 with forming bladders 34 is forced over the composite charge 20 and the mandrel 10 to form the composite part. The forming bladders 30 press downward and laterally against the bending portions of the composite charge thus decreasing out-of-plane buckling. In FIGS. 2A, 2B, and 2C, the laminate plies of the composite charge 20 overhanging the mandrel 10 shear past one another over the entire overhang or flange length during the forming process. This creates a tendency for out-of-plane buckling, especially with thick laminates, long flange lengths, contoured parts, joggles or parts with inflections.

FIGS. 3A, 3B, and 3C illustrate the large surface area where laminate plies shear past one another during forming of a composite charge 20 over a mandrel 10, utilizing the prior art methods of vacuum bagging or simple compression molding illustrated in FIG. 1 and FIGS. 2A, 2B, and 2C. In FIG. 3A, a flat composite charge 20 is placed over the mandrel 10. In FIG. 3B, as bending of the composite charge 20 occurs, a shear zone 22 exists where the laminate plies shear past one another. This inter-ply shear zone encompasses the entire overhang length or flange length of the part being formed. The magnitude of the shearing increases towards the edge of the flange.

In FIG. 3, shearing between the laminate plies in the shear zone 22 continues as the composite charge 20 is forced down over the mandrel 10. Shearing within the shear zone 22 results in out-of-plane buckling of laminate plies. Under prior art methods of vacuum bagging and compression molding, inner plies of the composite charge laid against the mandrel, are in compression from shearing against the outer plies as the composite charge 20 is formed over the mandrel 10. This is shown in prior art FIGS. 3B, and 3C, where the entire flange area 22 has slipping between the plies.

Therefore, an unmet need exists for a composite forming method and system which forms thick laminate charges and parts with contours, joggles, or long flanges, without out-of-plane buckling of the laminate plies.

SUMMARY OF THE INVENTION

The present invention minimizes the shear zone where plies and the composite laminate charge slide past one another during the forming process thereby reducing or eliminating out-of-plane fiber buckling.

A method for forming composite materials is presented. A composite charge wider than a first surface of a mandrel is positioned across the first surface of the mandrel. The portion of the composite charge overhanging the first surface of the mandrel is supported and urged against the mandrel while the unbent portion of the composite charge is supported substantially parallel to the first surface of the mandrel.

The invention also provides a system for forming composite materials. A compression mold of forming bladders and heater plates forms a composite charge over a mandrel and supports the unbent portions of the composite charge during forming substantially parallel to the upper surface of the mandrel.

BRIEF DESCRIPTION OF THE DRAWINGS

The preferred and alternative embodiments of the present invention are described in detail below with reference to the following drawings.

FIG. 1 is a cross-section of prior art vacuum bag forming of a composite charge;

FIGS. 2A, 2B, and 2C are cross-sections of prior art compression molding of a composite charge;

FIG. 6 is a cross-section of an exemplary forming machine utilizing the present invention.

DETAILED DESCRIPTION OF THE INVENTION

By way of overview, a method for forming composite materials is provided. A composite charge wider than a first surface of a mandrel is positioned across the first surface of the mandrel. The portion of the composite charge overhanging the first surface of the mandrel is supported and urged against the mandrel while the unbent portion of the composite charge is supported substantially parallel to the first surface of the mandrel. The invention also provides a system for forming composite materials. A compression mold of forming bladders and heater plates forms a composite charge over a mandrel and supports the unbent portions of the composite charge during forming substantially parallel to the upper surface of the mandrel. The present invention thus minimizes the shear zone where plies in the composite laminate charge slide past one another during the forming process thereby reducing or eliminating out-of-plane fiber buckling.

Figure 3A:
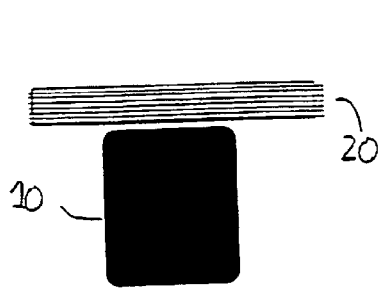
FIGS. 3A, 3B, and 3C are progressive cross-sections illustrating the laminate ply shear zone during prior art forming of composite charges.
Figure 3B:
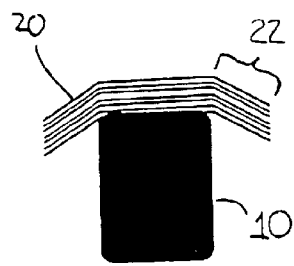
Figure 3C:
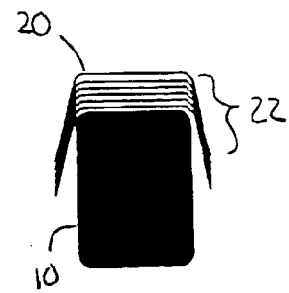
Figure 4A:
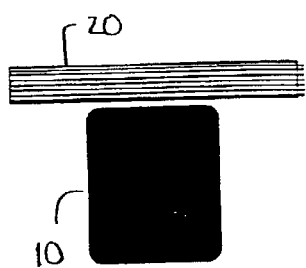
FIGS. 4A, 4B, and 4C are progressive cross-sections illustrating the laminate ply shear zone during forming by the present invention.
Figure 4B:
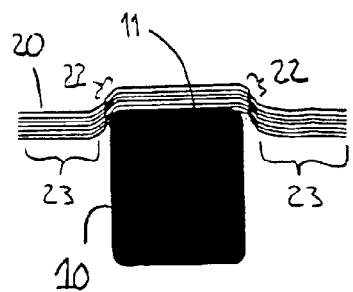
Figure 4C:
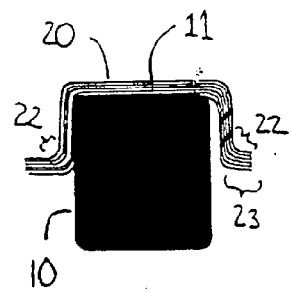

FIGS. 4A, 4B, and 4C are progressive cross-sections illustrating an embodiment of a forming method of the present invention. In FIG. 4A, a multi-ply composite charge 20 is placed against a first surface of a forming tool or mandrel 10. It will be appreciated that the composite charge may be any suitable material for forming composite parts, including, without limitation, dry fabric or pre-preg plies. FIG. 4B shows the composite charge 20 against the mandrel 10 as the forming method of the present invention is utilized. An overhanging portion 23 of the composite charge 20 is held substantially parallel to a first surface 11 of the mandrel 10 as the composite charge 20 is urged or formed over the mandrel 10. Substantially parallel suitably may be an angle ranging from parallel with the first surface 11 of the mandrel 10 to a small angle of up to 20°. As forming occurs, the plies of the composite charge 20 shear past one another in a shear zone 22. Advantageously, the shear zone 22 is limited in size and shear amount because the overhanging portion 23 of the composite charge 20 is held substantially parallel to the first surface 11 of the mandrel 10. Thus, the primary area where the pre-preg plies shear past one another is only as wide as the area immediately being molded against the mandrel 10. Holding the overhanging portion 23 of the composite charge 20 substantially parallel to the first surface 11 of the mandrel 10 results in an "S" shaped bend to the composite charge 20. The laminate plies of the composite charge 20 do not shear past one another where the composite charge 20 is already in contact with the mandrel 10. Similarly, the plies in the overhang area 23 held substantially parallel to the first surface 11 of the mandrel 10 do not slide past one another during forming or only minimally slide past one another. As a result, the shear zone 22, the area where plies are sliding past one another during molding is minimized. Minimizing the shear zone 22 substantially reduces or eliminates out-of-plane buckling of the composite fibers in the composite pre-preg plies. Supporting the overhanging portion 23 during forming also keeps the inner plies under tension.

FIG. 4C is a cross-section illustrating a later stage of forming the composite charge 20 over the mandrel 10 utilizing the method of the present invention. The composite charge 20 has been molded further over the sides of the mandrel 10 thereby decreasing the size of the overhanging portion 23 of the composite charge 20. The overhanging portion 23 is still held substantially parallel to the first surface 11 of the mandrel 10. The shear zone 22 of the composite charge 20 remains small as the composite charge 20 is progressively molded against the mandrel because, as in FIG. 4B, the portion of the composite charge 20 already molded against the mandrel 10 does not have any shear between its plies and similarly the overhanging portion 23 of the composite charge has no shear between its plies. Only the area where the composite charge 20 bends away from the mandrel 10 does shear occur as the composite charge 20 is progressively formed over the mandrel 10. As the composite charge 20 is molded against the mandrel 10, the shear zone 22 progressively moves outward towards the edges of the composite charge 20, with a limited area of the composite charge 20 being in shear at any point in the forming process.

Advantageously, according to the present invention, the primary shear zone 22 of the composite charge 20 is not the entire flange or area of the composite charge to be rolled against the mandrel 10, but is only that part of the charge curving away from the mandrel at each moment of forming. The present invention tensions the inner plies and minimizes the shear zone 22 by holding the unbent overhanging portions 23 of the composite charge 20 substantially parallel to the first surface 11 of the mandrel 10.

Figure 5A:
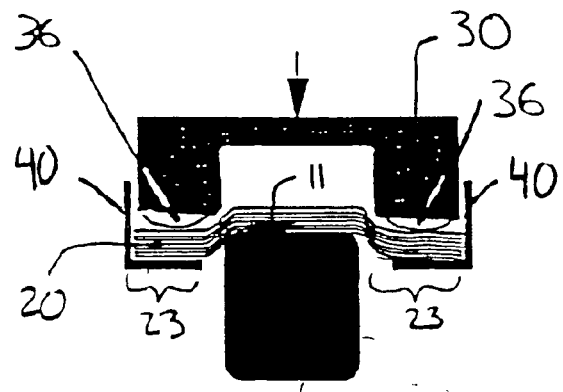
FIG. 5A is a cross-section of the present invention with pinch bladders.

FIG. 5A shows an embodiment of an apparatus utilizing the method of the present invention. A composite charge 20 is placed across a mandrel 10. The composite charge 20 is molded against the mandrel 10 by a compression mold 30. As molding occurs, the overhanging portions 23 of the composite charge 20 are supported substantially parallel to a first surface of the mandrel 10 by charge supports 40. In the embodiment shown in FIG. 5A, the compression mold 30 has pinch bladders 36 which pinch the overhanging portion 23 of the composite charge 20 against the charge supports 40 while forming occurs. Forming occurs when the compression mold 30 is forced over the composite charge 20 and the mandrel 10 while the supports 40 support the remaining unformed overhanging portion 23 of the composite charge 20. In this embodiment, the compression mold 30 is a low-pressure press.

Figure 5B:
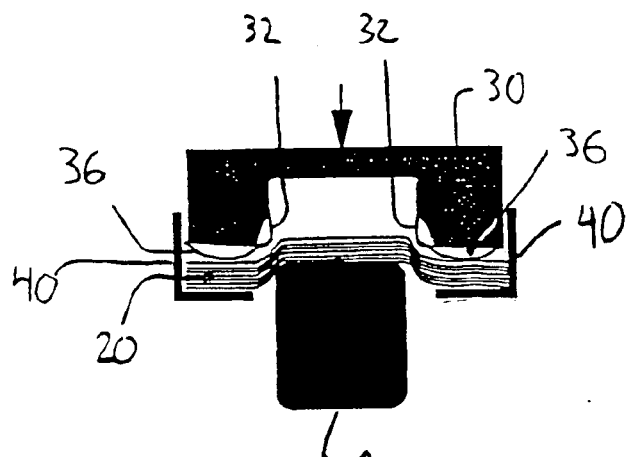
FIG. 5B is a cross-section of the present invention with pinch bladders and flexible tips.

FIG. 5B shows another embodiment of an apparatus of the present invention. In FIG. 5B, the composite charge 20 is placed over the mandrel 10. The overhanging portions 23 of the composite charge 20 are supported by charge supports 40. The compression mold 30 has flexible tips 32 at the corners of the compression mold 30 where the composite charge 20 is being pressed or urged against the mandrel 10. While the charge 20 is supported by the charge supports 40, the charge 20 is also pinched against the charge supports 40 by pinch bladders 36.

The flexible tips 32 of the compression mold 30 are any suitable flexible material that slides over the composite charge 20 assisting it in urging and forming the composite charge 20 against the mandrel 10 as the forming process proceeds. Alternate forming tips or urging devices may be suitably articulated, flexible, spring-loaded or pivoted to press against the composite charge 20 as it is being formed over the mandrel 10. By way of example, forming tips or urging devices may suitably include a spring board, a feather board, an elastic fairing, a compressible material, or a spring-loaded pad. A spring board is a flexible board that presses against the composite charge 20, while a feather board has flexible finger sections that press against the composite charge 20. An elastic fairing is a flexible material that is pulled over the composite charge 20. A compressible material or spring-loaded pad similarly press against the composite charge 20, urging it against the mandrel 10.

Figure 5C:
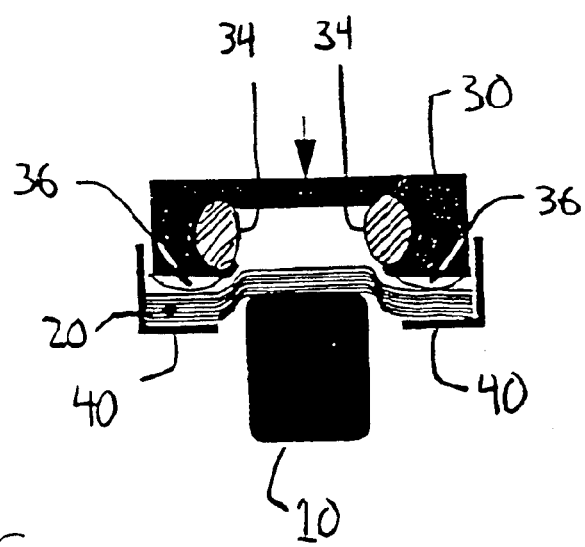
FIG. 5C is a cross-section of the present invention with pinch bladders and forming bladders.

FIG. 5C shows a further embodiment of the present invention. The composite charge 20 is placed over the mandrel 10. The overhanging portions 23 of the composite charge 20 are supported by charge supports 40. Forming is accomplished when the compression mold 30 is pressed towards the mandrel 10 and the composite charge 20. In this embodiment, the compression mold 30 has forming bladders 34 which are soft and flexible and press the composite charge 20 against the mandrel 10 as the composite charge 20 is being formed. The compression mold 30 has pinch bladders 36 which hold the composite charge against the charge supports 40 during the forming process until the overhanging portions 23 of the composite charge 20 are pressed against the mandrel 10. The forming bladders 34 may be any suitable flexible, sprung or pivoting material and may be any suitable shape. In one presently preferred embodiment, the forming bladders 34 are inflated fire hose. The forming bladders may also suitably be substituted for or supplemented with a spring board, a feather board, an elastic fairing, a compressible material, or a spring-loaded pad, or the like.

It will be appreciated that if the composite charge 20 is stiff, or otherwise holds itself against the charge supports 40, a pinching device such as a pinch bladder 36 may not be necessary to hold the composite charge 20. In that event, the unformed portions of the composite charge 20 still overhang the mandrel and are supported against the charge supports 40. Pressure from the compression mold 30 presses the overhanging unformed remainder of the composite charge 20 against the charge supports 40. This occurs as the composite charge 20 is bent against the mandrel 10 in the "S" shape, even without the pinch bladder 36. Thus some materials may be suitably formed by the present invention without any charge pinching device.

It will be appreciated that the method and system of the present invention may be utilized with different materials, forming processes and forming shapes. For example, forming may be aided by heating to soften the composite charge. Also, a low-friction plastic sheet may be placed over the laminate charge during forming. In one embodiment, forming using the present invention is accomplished by placing a fluorinated ethylene polypropylene sheet over the composite charge during forming.

FIG. 6 is a cross-section of one embodiment of the present invention. A composite forming machine 5 includes a mandrel 10 over which the composite charge 20 is formed. The machine 5 is shown at the start of the forming process. The composite charge 20 is placed across the upper surface of the mandrel 10. The overhanging portions of the composite charge 20 are supported substantially parallel to the upper surface of the mandrel 10 by charge supports 40. Substantially parallel suitably may be an angle ranging from parallel with the first surface 11 of the mandrel 10 (0°) to a small angle of up to 20°. In this embodiment the charge supports 40 are suitably parallel with the first surface 11 of the mandrel 10. In this embodiment, the charge supports incorporate heater plates 42. It will be appreciated that any suitable heater may be utilized, including, by way of example, infrared heaters or hot air heat guns. Heating softens the composite charge 20 aiding the forming process. Heating of the composite charge 20 pre-pregs prior to final cure is acceptable provided the pre-curing temperature and temperature duration limits of the composite charge being formed are not exceeded. Any suitable flange heating temperature may be utilized. The embodiment illustrated in FIG. 6 has the capacity of heating the flange from between 175 degrees to 195 degrees Fahrenheit. In one embodiment of the present invention approximately 175 degrees has been found to be a preferred formed temperature. It will also be appreciated that many composite charges may suitably be formed without heating.

During forming, the composite charge 20 is urged over the mandrel 10 by the compression mold 30. The compression mold 30 may be lowered over the mandrel 10 at any suitable rate. The machine illustrated in FIG. 6 may lower the compression mold 30 over the mandrel 10 at rates of between 0.1 inches to 10 inches per minute, with an examplary preferred forming rate of approximately 0.5 inches per minute. The compression mold 30 forms two sides of a beam, but it will be appreciated that a single-sided forming machine may use the same method and system.

The compression mold 30 forms the composite charge 20 over the mandrel 10 using flexible forming bladders 34. In one embodiment, the forming bladders are suitably inflated rubber tubing, but any flexible, low-friction, or pivoting material can be utilized. The forming bladders 34 may be inflated to any suitable pressure, typically between 5 and 100 psi. Approximately 40 psi has been found to be a preferred pressure for forming "C" shaped aircraft channels over the mandrel 10. The amount of bladder interference, which is the amount the forming bladders 34 are deflected or squeezed by the mandrel 10 and the composite charge 20 as the forming bladders 34 press against them during forming, which is also the amount with which the forming bladders 34 project over the upper surface of the mandrel 10, before the forming process starts, can be varied to any suitable distance. A preferred bladder interference distance is 0.375 inches.

The compression mold also has pinch plates 38 which assist in holding the composite charge 20 against the charge supports 40 where the composite charge 20 overhangs the mandrel 10. During forming, the compression mold 30, in concert with the forming bladders 34, pinch plates 38, charge supports 40 and heater plates 42, are moved downward over the mandrel 10 forming the composite charge 20 into the shape of the mandrel 10. During forming, the heater plates 42 are activated thereby softening the composite charge. Any suitable heater plate may be utilized. In one embodiment of the invention, the heater plate has a non-metallic bumper on the edge that abuts the mandrel 10.

The machine 5 operates as follows. The composite charge 20 is fabricated in an acceptable manner, such as manually or by an automated process such as a flat-tape laminator or contoured tape-laying machine. The charge 20 is then transferred to the mandrel 10 and positioned on the mandrel 10. The compression mold 30 is lowered near the composite charge. The charge supports 40 with heater plates 42 are positioned against the mandrel 10 immediately underneath the compression mold 30 and under the overhanging portions of the composite charge 20. The composite charge is heated to the desired temperature only in the flange area that will be formed. Once the laminate charge 20 is heated, the pinch plate 38 is inflated and the compression mold 30 is lowered over the mandrel. The composite charge holders 40 are lowered simultaneously with the compression mold 30, holding any unformed overhanging portion of the composite charge 20 substantially parallel to the upper surface of the mandrel 10. The forming bladders 34 maintain pressure on the composite charge thereby tensioning the composite charge material as it forms against the mandrel. As the compression mold 30 is lowered over the mandrel 10, the overhanging flange material of the composite charge 20 slips along the heater plate 42. Advantageously, this also assists in creating tension in the lower laminate plies. With the unformed portion of the composite charge 20 maintained substantially parallel to the upper surface of the mandrel 10, the composite charge is held in an "S" shape. This assists in tensioning inner and outer plies and minimizes the zone in which ply slippage occurs. As the composite charge is urged down against the sides of the mandrel, ply slippage only occurs in the lower portion of the "S" bend where the composite charge is being pressed against the sides of the mandrel 10 by the forming bladder 34. Once the charge has been completely formed, the movement of the compression mold 30 down over the mandrel 10 stops. The compression mold 30 is held in this position until the composite charge 20 cools. The charge supports 40 are retracted and the compression mold 30 is then raised, leaving the formed composite charge 20 over the mandrel 10. Typically, the composite charge 20 is heat-cured over the mandrel 10, and is held in place over the mandrel 10 by a vacuum bag (not shown) during curing.

The method of the present invention thus progressively forms the composite charge 20 over the mandrel tool 10, keeping laminate plies in tension, minimizing the area of inner ply shearing, enabling the composite charge to accommodate complex and three-dimensional mandrel contours. It will be appreciated that the forming parameters and configurations of the forming machine vary based upon the composite charge 20 materials, the thickness of the composite charge 20, and the shape being formed.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for forming composite materials, the method comprising:
    providing a composite charge having a first surface and a first width;
    positioning the composite charge across a second surface of a mandrel, the second surface having a second width that is less than the first width, such that at least a first portion of the composite charge overhangs the second surface of the mandrel;
    supporting the first portion of the composite charge substantially parallel to the second surface; and
    urging against a side of the mandrel a first section of the first portion that is adjacent to the mandrel while supporting a second section of the first portion substantially parallel to the second surface.

2. The method of claim 1, further comprising heating the composite charge as the composite charge is urged against the mandrel.

3. The method of claim 1, further comprising pinching the second section while holding the second section substantially parallel to the second surface.

4. The method of claim 3, wherein pinching utilizes a pinching device that is arranged to pinch the second section.

5. The method of claim 4, wherein the pinching device includes a first bladder that is arranged to pinch the second section.

6. The method of claim 4, wherein the pinching device includes at least one of a flexible tip, a spring board, a feather board, an elastic fairing, a compressible material, a pivoting pad, and a spring-loaded pad.

7. The method of claim 1, wherein urging utilizes an urging device that is arranged to form the first section.

8. The method of claim 7, wherein the urging device includes a second bladder.

9. The method of claim 7, wherein the urging device includes at least one of a flexible tip, a spring board, a feather board, an elastic fairing, a compressible material, a pivoting pad, and a spring-loaded pad.

* * * * *